(12) United States Patent
Mosteiro Goyoaga

(10) Patent No.: US 8,657,314 B2
(45) Date of Patent: Feb. 25, 2014

(54) STABILIZER LINK FOR A VEHICLE SUSPENSION AND METHOD FOR OBTAINING IT

(75) Inventor: José Ramón Mosteiro Goyoaga, Amorebieta (ES)

(73) Assignee: EDAI Technical Unit, A.I.E. (ES)

( * ) Notice: Subject to any disclaimer, the term of this patent is extended or adjusted under 35 U.S.C. 154(b) by 0 days.

(21) Appl. No.: 13/426,787

(22) Filed: Mar. 22, 2012

(65) Prior Publication Data

US 2012/0242056 A1    Sep. 27, 2012

(30) Foreign Application Priority Data

Mar. 22, 2011    (EP) .................................... 11382075

(51) Int. Cl.
*B60G 21/055*    (2006.01)
(52) U.S. Cl.
USPC ...... 280/124.107; 280/124.116; 280/124.152; 280/124.134
(58) Field of Classification Search
USPC .................... 280/124.101, 124.106, 124.107, 280/124.152, 124.111, 124.116, 124.134, 280/104
See application file for complete search history.

(56) References Cited

U.S. PATENT DOCUMENTS

| | | | | |
|---|---|---|---|---|
| 4,725,159 A * | 2/1988 | Wood, Jr. | .................... | 403/133 |
| 4,750,885 A * | 6/1988 | Ito | .................... | 403/135 |
| 5,165,306 A * | 11/1992 | Hellon | .................... | 74/588 |
| 5,720,833 A * | 2/1998 | Grube et al. | .................... | 156/73.1 |
| 5,743,669 A | 4/1998 | Fujita et al. | | |
| 5,795,092 A * | 8/1998 | Jaworski et al. | .................... | 403/56 |
| 2005/0051974 A1 | 3/2005 | Dobson et al. | | |
| 2008/0211202 A1* | 9/2008 | Belding et al. | ......... | 280/124.107 |
| 2009/0129854 A1* | 5/2009 | Walter et al. | .................... | 403/42 |
| 2010/0052282 A1* | 3/2010 | Baumer et al. | ......... | 280/124.107 |
| 2011/0089658 A1* | 4/2011 | Buhl et al. | ............. | 280/124.106 |
| 2011/0133422 A1* | 6/2011 | Jeong | .................... | 280/124.1 |
| 2011/0133425 A1* | 6/2011 | Jeong | .................... | 280/124.134 |
| 2011/0221153 A1* | 9/2011 | Bladt et al. | ............. | 280/124.106 |

FOREIGN PATENT DOCUMENTS

| | | |
|---|---|---|
| DE | 3843331 A1 | 7/1989 |
| DE | 3921468 C1 | 5/1990 |
| DE | 19522336 A1 | 12/1995 |
| DE | 102006013646 A1 | 9/2007 |
| DE | 102006049540 A1 | 4/2008 |
| DE | 102006051609 A1 | 5/2008 |
| DE | 202007001892 U1 | 6/2008 |

(Continued)

OTHER PUBLICATIONS

European Search Report EP11382075: Search Completion Date Sep. 21, 2011.

*Primary Examiner* — Nicole Verley
*Assistant Examiner* — Darlene P Condra
(74) *Attorney, Agent, or Firm* — Cantor Colburn LLP

(57) ABSTRACT

The present invention relates to a stabilizer link for a vehicle suspension and method for obtaining it, which allows reducing its cost, as a well as a faster and easier assembly, for which purpose it includes a longitudinal body having two ends with holes in which an articulation element is housed, and a central sector, having at each end a hole, wherein the longitudinal body is formed from two identical parts arranged such that they are facing one another and remain attached by means of a plastically deformable attachment element such that once it is deformed, it prevents the separation of the parts.

12 Claims, 5 Drawing Sheets

(56) References Cited

FOREIGN PATENT DOCUMENTS

| | | |
|---|---|---|
| DE | 102008015799 A1 | 10/2009 |
| EP | 0479598 A2 | 4/1992 |
| EP | 0712741 A1 | 5/1996 |
| EP | 1217233 A1 | 6/2002 |
| EP | 1712379 A1 | 10/2006 |
| EP | 1953012 A2 | 8/2008 |
| JP | 08233009 | 9/1996 |
| WO | 0142034 A1 | 6/2001 |
| WO | 2007147695 A1 | 12/2007 |

* cited by examiner

STABILIZER LINK FOR A VEHICLE SUSPENSION AND METHOD FOR OBTAINING IT

TECHNICAL FIELD

The present invention relates to a stabilizer link for a vehicle suspension as well as to a method for obtaining it, having an application in the field of the automotive component industry.

BRIEF DISCUSSION OF RELATED ART

The suspension systems of automotive vehicles today comprise stabilizer links which are arranged between the vehicle chassis and the suspension of each wheel. These links are usually formed by a tubular-shaped element incorporating respective housings at its ends for the assembly of articulations, usually rubber bearings or ball joints.

There is currently a wide range of stabilizer links which have different configurations according to each specific application, although these elements usually have a series of requirements that are common for all of them, which include having a determined torsional strength, having the lowest weight possible, allowing the fastest assembly possible and having the lowest cost possible.

European patent no. EP-1217233 discloses an articulated connecting part for connecting constructive elements arranged in the chassis of an automobile, in which the ends of a solid central part are flattened for providing a configuration which enables a simple housing for a ball joint.

On the other hand, international application no. WO-2007/147695 discloses a method for the production of a link for a multi-arm suspension in which the material used for obtaining it is reduced by means of a series of cutting and folding operations, such that a hollow U-shaped element is achieved which has limited strength features.

Consistent with the preceding link, European patent no. EP-1953012 discloses a link having an open section in which a ball joint is fixed in the hole of each end by means of the co-extrusion of a plastic casing.

Likewise, European patent application no. EP-0479598, on which the preamble of claim 1 of the present application is based, discloses a link which is formed from the attachment of two halves, which are attached by means of folding a plurality of tabs arranged in each part in a staggered manner. Likewise, each of the parts has at one end a concave curved shape provided for receiving a spherical bushing of a ball joint.

The drawbacks of this link, and to a great extent in the aforementioned links as well, is that it has a high manufacturing cost as a result of having to manufacture parts with very accurate dimensions and complex shapes, in addition to the process for obtaining it being slow since it is necessary to fold each tab in order to attach both halves. Furthermore, none of these links allows replacing the support elements of a ball joint in the event of failure without replacing the entire link.

BRIEF SUMMARY

A first aspect of the present invention relates to a stabilizer link.

Said stabilizer link can be used for any type of articulation, either for ball joints or bearings, significantly reducing production costs given that an extremely lightweight single part is obtained which allows a quick assembly of the link for obtaining it and which allows the replacement of an articulation if needed without having to replace the entire link, all with optimal mechanical behavior, being sufficiently rigid.

To that end the stabilizer link for a vehicle suspension comprises a longitudinal body having two ends and a central sector. Each end has a hole in which an articulation element is housed.

According to the invention, the longitudinal body is formed from two identical parts having an open section which are arranged such that they are facing one another precisely by their open sides, faces or areas and remain attached by means of at least one plastically deformable attachment element such that once it is deformed, it prevents the separation of the parts.

Other secondary aspects of the invention are defined in the dependent claims.

A second aspect of the invention relates to a method for obtaining a stabilizer link.

The method of the invention allows significantly reducing the production time and cost for the stabilizer link.

To that end the method comprises:
  obtaining two identical parts by means of mechanical stamping, each part having two ends and a central sector, each end having a hole,
  arranging said parts facing one another,
  placing at least one plastically deformable attachment element with respect to the facing parts, and
  plastically deforming said attachment element until it prevents the separation of the parts.

Other secondary aspects of the invention are defined in the dependent claims.

BRIEF DESCRIPTION OF THE DRAWINGS

To complement the description that is being made and for the purpose of aiding to better understand the features of the invention according to a preferred practical embodiment thereof, a set of drawings is attached as an integral part of said description in which the following has been depicted with an illustrative and non-limiting character.

DETAILED DESCRIPTION

Figure 1:
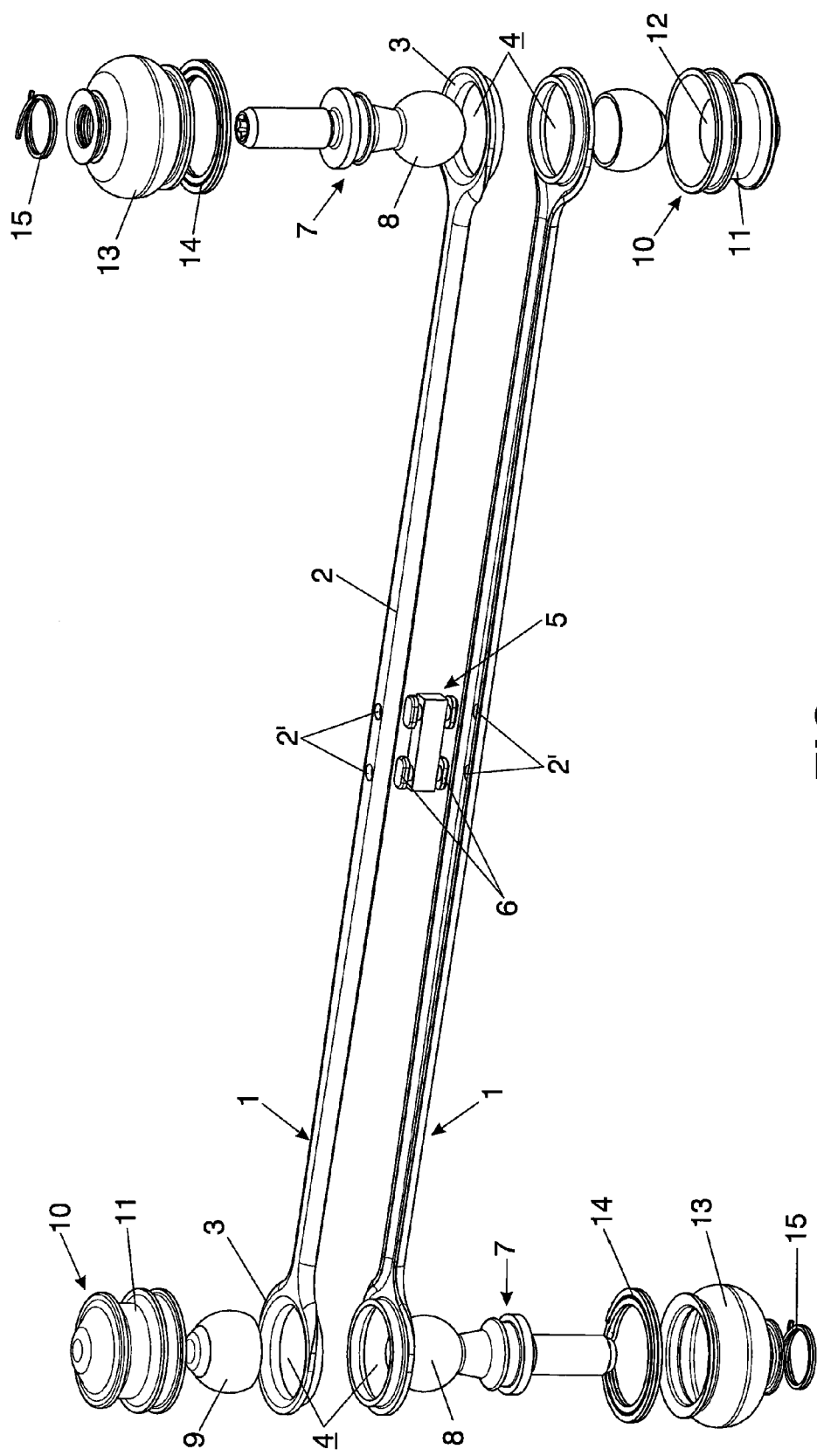
FIG. 1 shows an exploded perspective view of a preferred embodiment of the stabilizer link of the invention, in which the external housing elements and the central attachment element are depicted in an already plastically deformed state.

In view of the discussed figures, it can be observed how in one of the possible embodiments of the invention the stabilizer link for a vehicle suspension proposed by the invention comprises a longitudinal body having two ends (3) and a central sector (2), having at each end (3) a hole (4) in which an articulation element (7) is housed.

The longitudinal body is formed from two identical parts (1) which are arranged such that they are facing one another and remain attached by means of at least one plastically deformable attachment element (5) such that once it is deformed, it prevents the separation of the parts (1).

Each part (1) likewise comprises at least one central hole (2') located in the central sector (2), where the central sector (2) of the parts (1) is hollow, the attachment element consisting of a central attachment element (5) which is housed inside the central sectors (2) of the facing parts (1).

The central attachment element (5) comprises at least two facing bosses (6) suitable for being introduced through a central hole (2') of each part (1) and being plastically deformed once introduced to prevent the separation of the parts (1).

The stabilizer link likewise comprises at least one external housing element (10) which can be introduced through the hole (4) defined by the facing ends (3) of two parts (1), said external housing element (10) being able to be plastically deformed at its base once introduced through the hole (4), preventing the separation of the parts (1) as they are retained in an annular groove (11) of the external housing element (10).

Said external housing element (10) internally has a housing (12) configured to tightly house and retain an internal housing element (9) having a spherical inner surface, suitable for housing a spherical element (8) of an articulation element (7).

Figure 2:
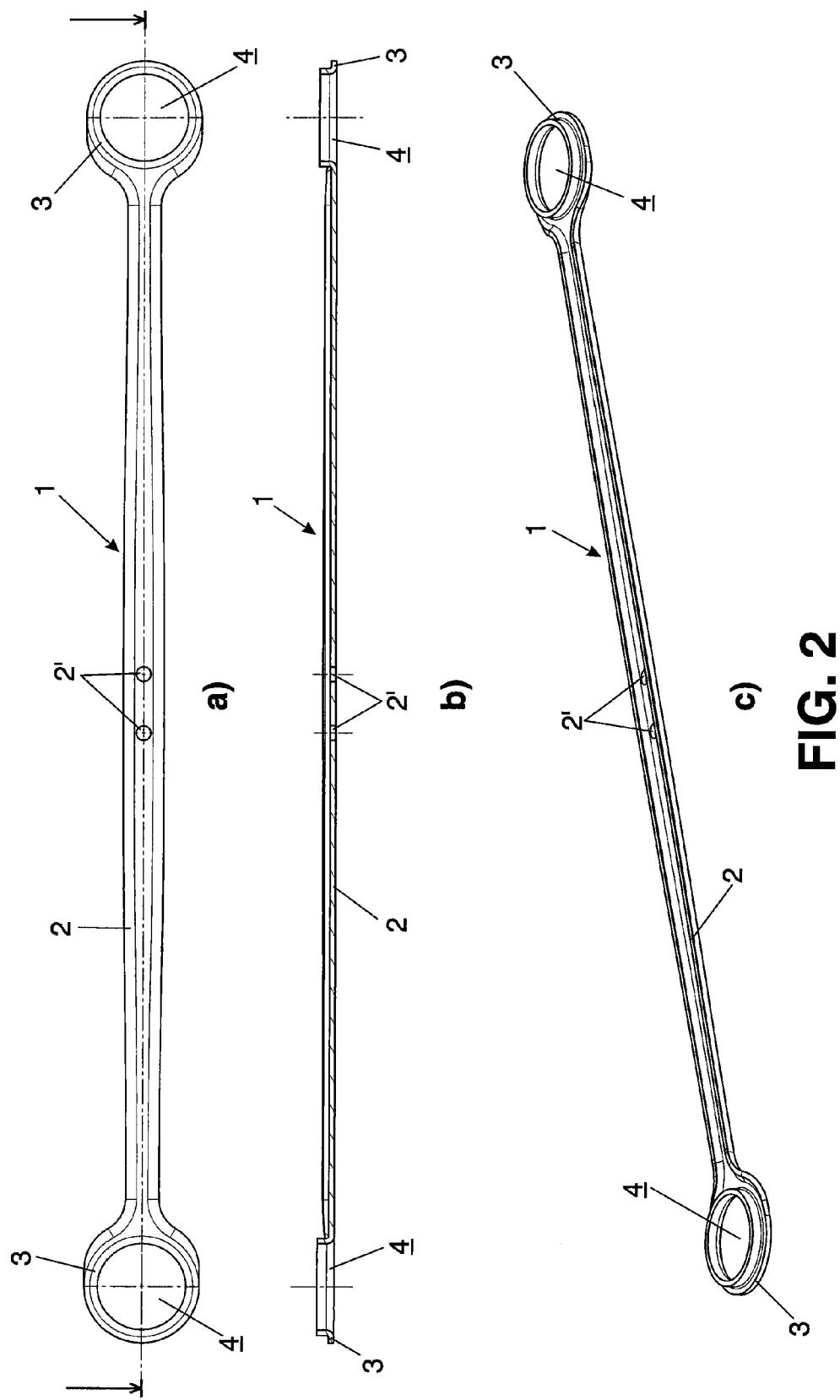
FIG. 2 shows three views, a plan view, elevational view and perspective view, of one of the two parts forming the longitudinal body of the link depicted in FIG. 1.
Figure 3:
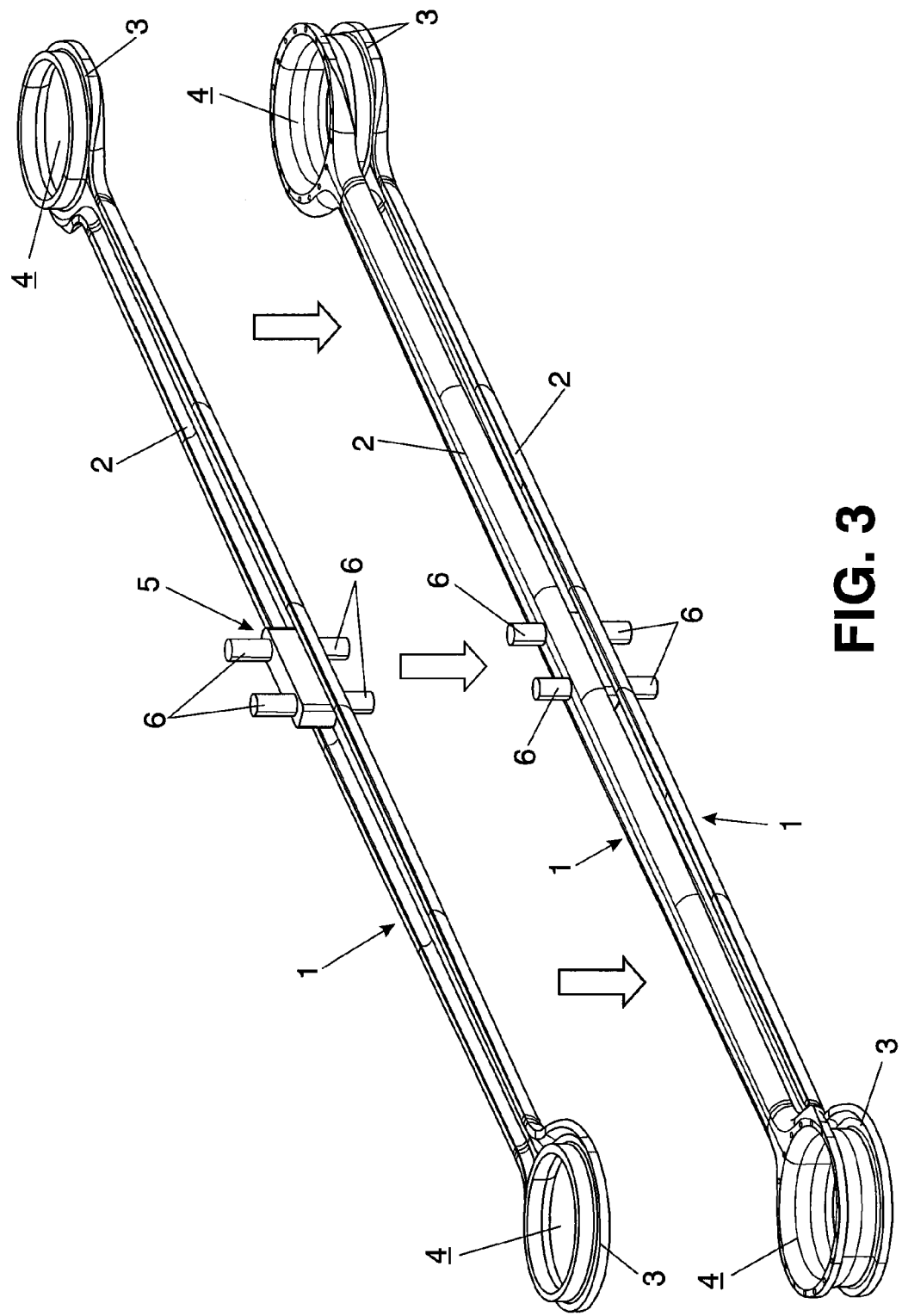
FIG. 3 shows two perspective views illustrating a sequence for assembling the central attachment element for the attachment of the two parts forming the longitudinal body.
Figure 4:
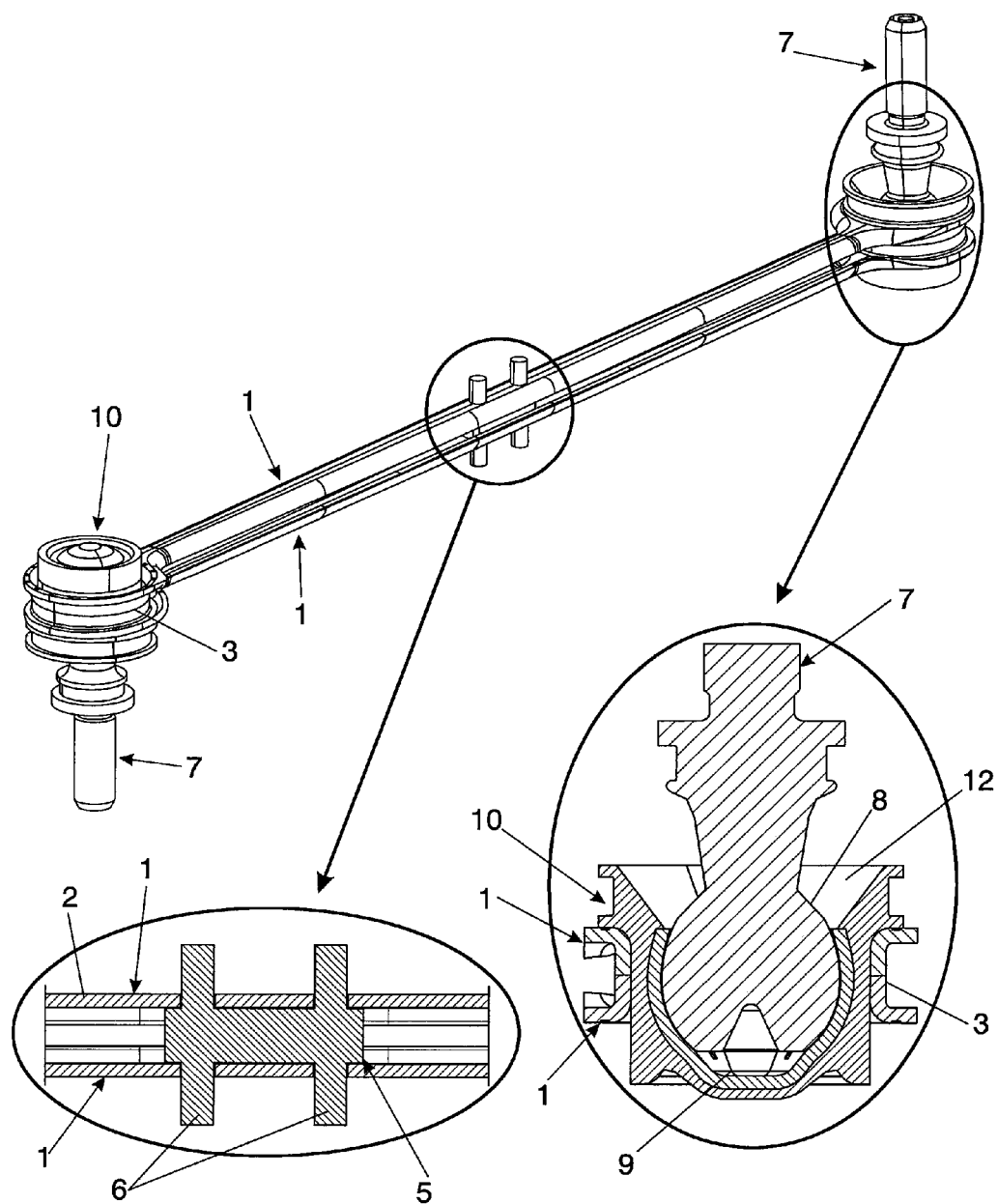
FIG. 4 shows a perspective view and two schematic details of a step of the assembly process subsequent to that depicted in FIG. 3, whereby the link of the invention is obtained, in which the bosses of the central attachment element and the bases of the external housing elements are plastically deformed.
Figure 5:
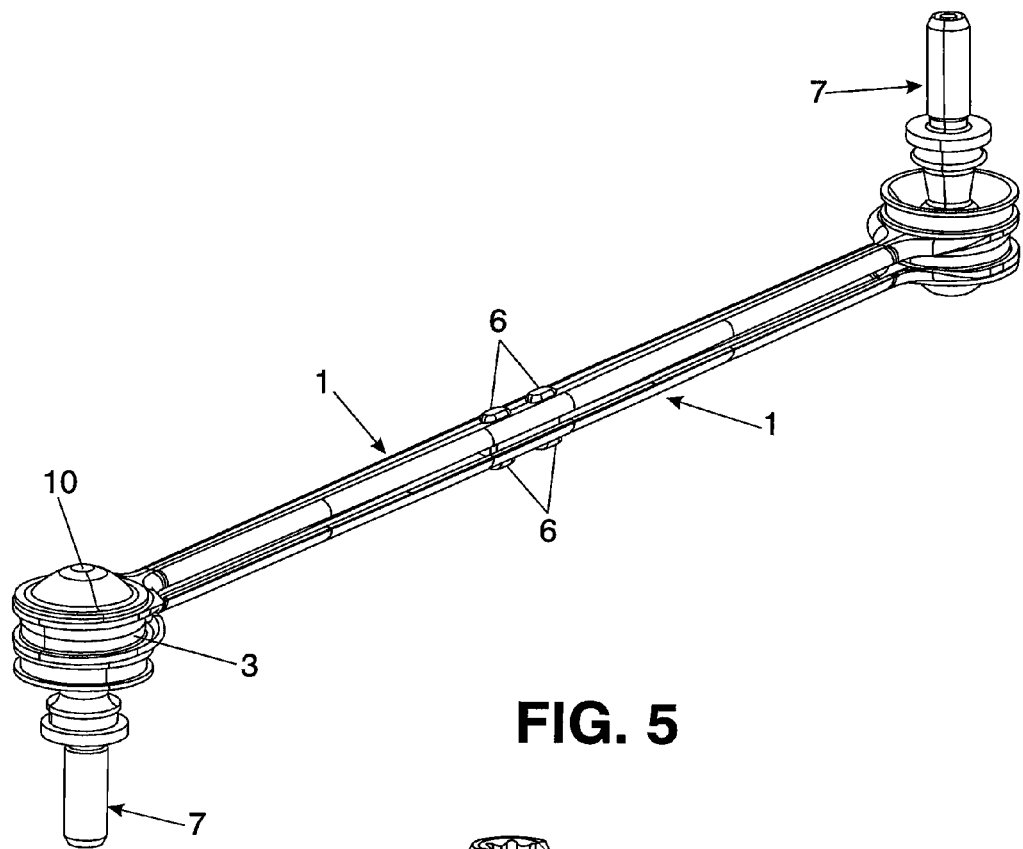
FIG. 5 shows a perspective view of an assembly step subsequent to that depicted in FIG. 4.
Figure 6:
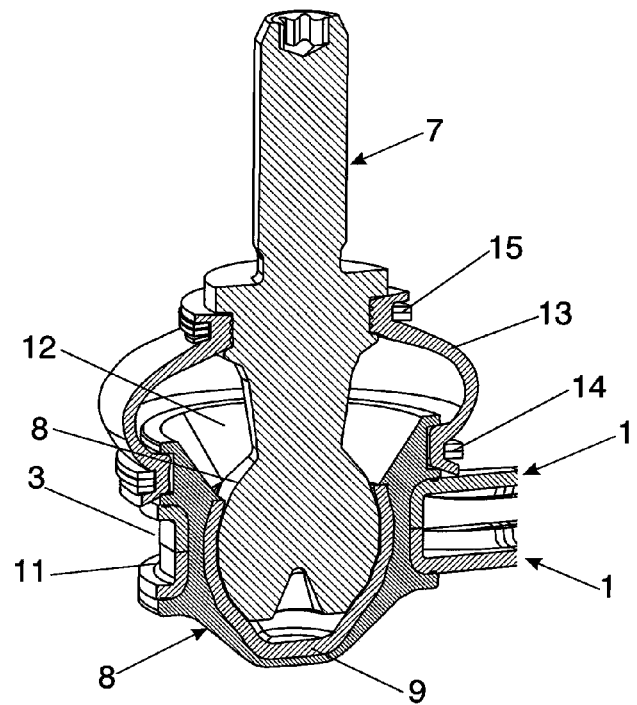
FIG. 6 shows a longitudinal section, according to a perspective view, of one end of the link with an articulation element, in which the arrangement of a leak-tight element and of the corresponding gaskets can be seen.

As can be seen in FIG. 2, the central sector (2) of the parts (1) is slender and the holes (4) of the ends have a circular configuration, being concentric to the outer contour of the ends (3) which for the most part is also circular. The two holes (4) of the ends (3) are likewise aligned according to a longitudinal axis of the straight sector (2) of each part (1), which is symmetrical with respect to the longitudinal axis and has a substantially planar configuration.

It is likewise contemplated that the stabilizer link comprises at least one leak-tight element (13) located at one end (3) suitable for protecting the spherical element (8) of the articulation element (7), with the corresponding first gaskets (14), located entre the leak-tight element (13) and the external housing element (10), and second gaskets (15) arranged in the upper part for receiving the corresponding nut.

The invention claimed is:

1. Stabilizer link for a vehicle suspension, comprising:
    a longitudinal body having two ends, and
    having at each end a hole in which an articulation element is housed, and a central sector,
    wherein the longitudinal body is formed from two identical parts having an open section, which are arranged such that they are facing one another by their open sides and remain attached by means of at least one plastically deformable attachment element such that once it is deformed, it prevents the separation of the parts,
    wherein each part comprises at least one central hole located in the central sector, wherein the central sector of the parts is hollow, the attachment element comprising a central attachment element which is housed inside the central sectors of the facing parts, said central attachment element comprising at least two facing bosses suitable for being introduced through the at least one central hole of each part and being plastically deformed once introduced to prevent the separation of the parts.

2. Stabilizer link according to claim 1, comprising at least one external housing element which can be introduced through the hole defined by the facing ends of two parts, said external housing element being able to be plastically deformed once introduced through the hole, preventing the separation of the parts.

3. Stabilizer link according to claim 2, wherein the external housing element internally has a housing configured to tightly house and retain an internal housing element having a spherical inner surface, suitable for housing a spherical element of an articulation element.

4. Stabilizer link according to claim 3, comprising at least one leak-tight element located at one end suitable for protecting the spherical element of the articulation element.

5. Stabilizer link according to claim 2, comprising an external housing element housed in each end of the parts.

6. Stabilizer link according to claim 1, wherein the central sector of the parts is slender and the holes of the ends have a circular configuration, being concentric to an outer contour of the ends which is also circular.

7. Stabilizer link according to claim 6, wherein the two holes of the ends are aligned according to a longitudinal axis of the central sector of each part.

8. Stabilizer link according to claim 7, wherein each part is symmetrical with respect to the longitudinal axis.

9. Stabilizer link according to claim 1, wherein the parts have a substantially planar configuration and are obtainable by means of mechanical stamping.

10. Suspension system comprising a stabilizer link according to claim 1.

11. Vehicle comprising a stabilizer link according to claim 1.

12. Vehicle according to claim 11, wherein the stabilizer link comprises a first articulation element which is linked to a wheel of the vehicle, and a second articulation element which is articulated to a frame of said vehicle.

* * * * *